United States Patent [19]

Brambilla et al.

[11] 4,317,841

[45] Mar. 2, 1982

[54] PROCESS FOR THE DEACIDIFICATION OF A COFFEE EXTRACT

[75] Inventors: Edgardo Brambilla, Vevey; Ian Horman, Corseaux, both of Switzerland

[73] Assignee: Societe D'Assistance Technique Pour Produits Nestle S.A., Lausanne, Switzerland

[21] Appl. No.: 128,725

[22] Filed: Mar. 10, 1980

[30] Foreign Application Priority Data

Apr. 18, 1979 [CH] Switzerland ............... 3632/79

[51] Int. Cl.³ ............................................ A23F 5/18
[52] U.S. Cl. ............................. 426/239; 426/594; 426/422
[58] Field of Search ............. 426/239, 422, 594

[56] References Cited

U.S. PATENT DOCUMENTS

| | | | |
|---|---|---|---|
| 2,089,116 | 8/1937 | Dyckerhoff | 426/239 X |
| 3,369,906 | 2/1968 | Chen | 426/239 |
| 4,278,696 | 7/1981 | Magliolato | 426/422 |

*Primary Examiner*—Joseph M. Golian
*Attorney, Agent, or Firm*—Vogt & O'Donnell

[57] ABSTRACT

A process for reducing the acidity of a coffee extract is described in which the coffee extract undergoes electrodialysis. The non-cathodic extract is collected, contacted with subdivided chitosan and, after removal of the chitosan, is mixed with at least a part of cathodic extract to provide a deacidified coffee extract.

10 Claims, No Drawings

PROCESS FOR THE DEACIDIFICATION OF A COFFEE EXTRACT

This invention is concerned with the treatment of coffee extracts in order to reduce their acidic content.

There are various reasons, such as flavour or physiological, for reducing the acidity of coffee extracts. One method for reducing acidity is chemical neutralization, with an edible alkaline agent such as sodium or potassium hydroxide, or a suitable carbonate or bicarbonate. However, it will be readily appreciated that this method is not acceptable when it is desired to preserve the natural image of the extracts. Furthermore, from a technical standpoint, there is a substantial increase in saline content which impairs flavour.

A process has been devised for the deacidification of coffee extracts without the introduction of foreign substances and in which the deacidification is accomplished by contact with chitosan. It produces substantial increases in the pH of roasted coffee extracts, as much as 1.4 to 1.5 units, but in practice it is difficult to go any higher and, what is more, the increases in pH are considerably smaller when the extracts are of green coffee.

An object of this invention is to overcome the limitations noted above without introducing foreign substances into the coffee extract. The invention provides a process for reducing the acidity of aqueous coffee extracts which comprises subjecting the extract to electrodialysis, recovering a cathodic and a non-cathodic extract, contacting the non-cathodic extract with chitosan in divided form, removing the chitosan and combining the non-cathodic extract with at least a part of the cathodic extract. For convenience, the operation of reducing the acidity of a coffee extract may hereafter sometimes be referred to as "deacidification"; use of the term "deacidification" does not necessarily imply total removal of acids.

Electrodialysis is an electrochemical technique which allows the separation of ions in solution according to their charge, by migration across a membrane under the influence of an electric field.

Classical electrodialysis uses membranes which are selectively permeable to cations and anions. Variants of electrodialysis, included also in the framework of the process according to the invention, use neutral membranes exclusively or in part.

The objective is to transport the metallic ions in the coffee extract towards the cathode in such a way that the contents of the compartment or compartments other than the strictly cathodic compartment are enriched in free acids and their pH decreases. It is this part of the starting extract, of lowered pH, which is designated the "non-cathodic extract" and is found either in the anode compartment, and also in intermediate compartments if such are provided.

Chitosan in the strict sense is a natural polyglucosamine of fungal origin, which is also found in abundance in the shells of crustaceans and many insects in the form of chitin (acetyl-chitosan). Commercial chitosan is generally produced by de-acetylation of chitin, and some 10 to 30% of the amino groups present usually remain in acetylated form.

In the wide sense, which is that of the invention, the term "chitosan" includes products which are natural or of natural origin and closely related to chitosan, and which can be defined as polysaccharides bearing free amino groups. As an example, one may cite the cell-wall constituents of gram-positive bacteria such as *Bacillus subtilis*.

This chitosan, which is obtainable in flake or powder form, may be used as is, but it is generally preferable to submit it to a preliminary purification treatment. One such treatment is to wash the chitosan with alcohol, for example 35% aqueous isopropanol. If necessary, the chitosan may be deodorized by stripping the disagreable odoriferous residues with steam, especially in alkaline conditions.

The coffee extracts may be extracts of green or roasted coffee. Any suspended solids may be removed by filtration or centrifuging and, if need be, reincorporated in the deacidified extract. Likewise aromatics may be stripped with steam and returned at a later stage.

It is advantageous to recombine deacidified extracts of green coffee with the green beans before roasting.

In the electrodialysis, as the first stage of the process, the following working conditions have been found to be optimal for treatment of coffee extracts:

| temperature | 10 to 70° C. | |
|---|---|---|
| electric field | 0.01 to 0.5 | v/cm/g of dry extract |
| current density | 0.5 to 20 | mA/CM$^2$ of membrane |

The duration of the electrodialysis under these conditions is normally between 5 minutes and 24 hours, according to the objective sought. Between 1 and 100 kg of soluble coffee solids may be treated per M$^2$ of membrane per hour. Preferably, membranes of cellulose acetate are used. Suitable charged membranes are sulphonated polystyrenedivinylbenzenes (cationic membranes) and the aminated polystyrene-divinylbenzenes (anionic membranes), fixed on inert fibrous polymers.

The starting extract of coffee usually has the following characteristics:

| green coffee extract | pH | 5.5 to 6.0 |
|---|---|---|
| | soluble solids content | preferably 1 to 15% |
| | free acid content | 0.5 to 15% of total acids |
| roasted coffee extract | pH | 4.8 to 5.2 |
| | soluble solids content | 1 to 50% preferably 12 to 25% |
| | free acid content | 5 to 20% of total acids |

Typically, it is observed that 5 to 80% of the bound acids of the starting extract are released from their salts and are found in the non-cathodic extract as free acids. The pH of the non-cathodic extract falls by 0.1 to 1.8 pH units, that of the cathodic extract increases by 5 to 8 units.

There are various ways of contacting the noncathodic extract with chitosan. For example, the extract may be run through a column of chitosan, and in this case the deacidified non-cathodic extract is recuperated directly at the base of the column. Another possibility is to suspend the chitosan in the extract for a suitable period of time and then separate the extract, for example by siphoning and decanting, or by filtration.

The contact time between the chitosan and the non-cathodic extract, as well as various other parameters such as the temperature during contact and the proportion of chitosan to extract, depend on the level of deacidification sought and on the practical aspects of the operation. As a general rule, a contact time of 5 to 30 mn at a temperature of 10° to 80° C. is satisfactory. Favourable working proportions of extract/chitosan are in the range 10 to 400 ml/g.

It must be understood that chitosan is a very selective absorbent of acid substances and that the loss of non-acid solids is always minimal. Between the untreated non-cathodic extract and the deacidified non-cathodic extract, there is a solids loss of 1 to 4%, which is consistent with the amount of acid in the non-cathodic extract before treatment.

Of the acids in free form which are found in the non-cathodic extracts, chlorogenic is the most abundant, and it is this acid which is chiefly retained by the chitosan. Of the other acids, such as oxalic, citric, fumaric, malic, pyruvic, quinic and caffeic, which are also present in the coffee extracts, the level is found to be reduced.

Although chitosan is an abundant material, it is preferable to regenerate and recycle it after use. It has been found that it may be re-used 30 to 50 times without significant loss of activity.

Regeneration may be very simply accomplished by contact with an alkaline solution and rinsing with water until the natural pH of the chitosan is reached. Regenerated chitosan may be used directly for a new treatment, without undergoing the preliminary purification mentioned above for fresh chitosan.

The non-cathodic extract deacidified by chitosan is mixed with the cathodic extract. The level of deacidification clearly is directly linked to the level of deacidification of the non-cathodic extract, and values between 10 and 75% of total acids (free and in salt form) can easily be achieved for the mixture. This corresponds, relative to the starting coffee extract, to pH increases of between 1.5 and 5 units. Relatively neutral coffee extracts, having a pH in the range 6.2 to 7.0 for example, can be obtained by adding to the deacidified non-cathodic extract a part only of the cathodic extract.

According to one preferred embodiment of the process according to the invention, an extract of green or roasted coffee, containing between 1 and 50% soluble solids, is electrodialysed as described above. The electrodialysis apparatus comprises two compartments separated by a membrane of cellulose acetate: the cathodic extract is that contained in the cathode compartment and the non-cathodic extract that contained in the other, the anode, compartment. A variation is to use electrodialysis apparatus comprising three compartments, separated by two cellulose acetate membranes: the cathodic extract is contained in the cathode compartment, whereas the non-cathodic extract is the contents of the middle and anode compartments, both having a reduced pH.

Chitosan is then suspended in the non-cathodic extract. The chitosan is either regenerated from a previous cycle of deacidification or fresh chitosan which has been washed with aqueous isopropanol and deodorized with steam. The proportion extract/chitosan is between 20 and 240 ml/g and the process is carried out at temperatures close to ambient. After an interval of between 10 and 30 minutes, during which time the suspension is constantly agitated, the solids are separated from the liquid by filtration and the non-cathodic deacidified extract is thus recuperated. The chitosan is re-suspended in water for rinsing, and after separation the rinse water is added to the non-cathodic deacidified extract. The deacidified non-cathodic extract is then combined with the cathodic extract.

The resulting mixture, if it is an extract of roasted coffee, is treated according to conventional instant coffee technology. A green coffee extract is recombined with the green beans from which it was prepared. The beans may then be dried and roasted.

According to the second preferred embodiment, beds of chitosan arranged in columns are used, and the non-cathodic extract prepared as above is allowed to run down these columns. The deacidified non-cathodic extract is thus recovered directly. Preferably, extract/chitosan ratios in the range 30 to 400 ml/g are used. The chitosan should have a fairly loose structure; finely powdered chitosan is to be avoided as the column becomes rapidly plugged.

At the end of the operations, the chitosan is regenerated by alkaline treatment followed by rinsing with fresh water, and can then be used for a new absorption cycle.

It is note worthy that the presence or absence of caffeine does not affect the process of this invention, either during electrodialysis or during deacidification with chitosan. The extracts to be treated may thus be either normal extracts, containing caffeine, or extracts containing little or no caffeine, obtained by partial or complete decaffeination of caffeine-containing extracts or by extraction of decaffeinated coffee beans.

The quality of the extracts obtained does not suffer from the treatment; neither the intensity nor the balance of aroma of the extracts is affected, and in the judgment of tasters who prefer a non-acid coffee, the treatment is considered to be clearly beneficial.

The following examples, in which the percentages are by weight, illustrate the carrying out of the process according to the invention. For convenience, the operations of preparation and regeneration of the chitosan, not a part of the present invention, are described first.

EXAMPLES

Preparation of chitosan

One kilogram of commercial powdered chitosan (crab chitosan, Biosynth. AG, particles of 0.5 to 2 mm) is suspended in 33 l of 55% of aqueous isopropanol, and stirred at ambient temperature for 30 mn. This is then centrifuged to recover 31.5 l aqueous isopropanol to be recycled, and the washed chitosan. If the chitosan still has some odour, it is suspended in 9.9 l of 0.1 N KOH and stripped with steam for 1 hour. The KOH solution is separated from the chitosan by centrifuging, which is washed with hot or cold water, centrifuged and then dried in hot air at 80° C.

Regeneration of chitosan

One kilogram of spent chitosan, having acted as absorbent, is suspended in 10 kg of a 1:1 mixture of isopropanol and 1 N KOH, and shaken at ambient temperature for 15 mn. It is then centrifuged to recover 9 kg of liquid phase and the chitosan, which is washed with hot water (80° to 90° C.) to neutrality of the washing water and dried at 80° C. under vacuum.

If necessary, the regeneration treatment may be completed after the washing phase by stripping with steam for 1 hour. Some isopropanol may thus be recovered. The regenerated chitosan is dried as before.

A comparison is made in terms of absorptive capacity, between one batch of fresh, washed chitosan with three batches of regenerated chitosan, in suspension in non-cathodic extract containing 13% soluble solids, added at a level of 2.5 g chitosan per 100 ml extract. For the four batches, the pH goes from 4.8 to 6.3, corresponding to a degree of deacidification of the order of 85%.

In parallel, the same chitosan is compared after successive regenerations, suspended in non-cathodic extract as described above, at a level of 5 kg chitosan per 250 l of extract. The degree of deacidification is remarkably constant, at around 70%, even after 15 successive regenerations.

EXAMPLE 1

300 ml of a aqueous extract of green coffee, containing about 1.3% soluble solids and having a pH of 5.8, are placed in the centre compartment of a laboratory electrodialysis unit of three compartments separated by two membranes of cellulose acetate. The cathode and anode compartments are filled with deionized water and a current of 100 mA is passed for 45 mn. At the end of this period, the pH of the non-cathodic extract (contained in the middle and anodic compartments) has fallen to 4.35 and that of the cathodic extract has risen to 12.25. It is estimated that 45% of the total acids of the starting extract are now in free form.

Fresh (or regenerated) chitosan is suspended in the non-cathodic extract, using 1.5 g chitosan for 300 ml extract, and stirred at ambient temperature for 30 mn. The phases are then separated by centrifuging and the liquid phase put aside. The chitosan is re-suspended in water and stirred at ambient temperature for 15 mn before centrifuging. This liquid phase is collected and added to the first liquid phase.

The pH is now 6.2 and 80% of the acids liberated by electrodialysis are estimated to have been retained by the chitosan. This corresponds broadly to 2% by weight of the green coffee beams used for the preparation of the starting extract.

The deacidified non-cathodic extract is combined with the cathodic extract, giving a mixture having a pH of 8.3. The chitosan is regenerated. The mixture is recombined with the green coffee beans simply by soaking dry beans in the mixture; after roasting, the coffee is transformed into instant coffee by conventional methods.

When the coffee is reconstituted with hot water, it has a pH of 7.3 compared to about 5.0 for ordinary coffee. There is no negative effect on the aroma due to the deacidification treatment, whereas if the pH of ordinary coffee is brought to 7.3 by addition of potassium, there is a distinct aroma of amines, resembling fish.

EXAMPLE 2

The procedure of Example 1 is repeated for the electrodialysis. However, contacting with chitosan is effected by percolating the non-cathodic extract through a column and the deacidified non-cathodic extract is collected directly at the bottom. The subsequent steps are as described in Example 1.

EXAMPLE 3

The procedure is the same as in Example 1, but a decaffeinated extract of green coffee is used, obtained from coffee beans decaffeinated by conventional methods (chlorinated solvents, for example). The following observations of pH are made:

| | |
|---|---|
| (1) starting extract: | 4.90 |
| (2) non-cathodic extract: | 3.95 |
| (3) cathodic extract: | 12.40 |
| (4) deacidified non-cathodic extract: | 5.70 |
| (5) deacidified extract, (3) + (4): | 8.90 |
| (6) reconstituted coffee: | 7.40 |

EXAMPLE 4

The procedure described in Example 1 is applied to an extract of roasted coffee with the following results:

| | |
|---|---|
| (1) starting extract: | 5.10 |
| (2) non-cathodic extract: | 4.50 |
| (3) cathodic extract: | 12.60 |
| (4) deacidified non-cathodic extract: | 6.00 |
| (5) deacidified extract, (3) + (4): | 7.80 |
| (6) reconstituted coffee: | 7.50 |

EXAMPLE 5

The procedure of Example 1 is applied to an extract of roasted coffee, decaffeinated with chlorinated solvents. The following results are obtained:

| | |
|---|---|
| (1) starting extract: | 5.10 |
| (2) non-cathodic extract: | 4.00 |
| (3) cathodic extract: | 12.80 |
| (4) deacidified non-cathodic extract: | 5.70 |
| (5) deacidified extract (3) + (4): | 9.50 |
| (6) final reconstituted coffee: | 9.20 |

We claim:

1. A process for the preparation of a coffee extract of reduced acidity, which comprises subjecting an aqueous coffee extract, selected from the group consisting of an extract of green coffee, an extract of roasted coffee, a decaffeinated extract of green or roasted coffed and an extract of decaffeinated green coffee, to electrodialysis, recovering a cathodic and non-cathodic extract, contacting the non-cathodic extract with chitosan in divided form, removing the chitosan, and combining the non-cathodic extract with at least a part of the cathodic extract, wherein the acidity of the coffee extract is reduced such that the pH is increased in excess of from 1.5 to 5 pH units.

2. A process according to claim 1, in which the electrodialysis is carried out in a unit of three compartments separated by two membranes, the cathodic extract being the contents of the compartment containing the cathode and the non-cathodic extract the contents of the remaining two compartments.

3. A process according to claim 1 or claim 2, in which the electrodialysis is carried out with membranes of cellulose acetate.

4. A process according to claim 1 or claim 2, in which the electrodialysis is carried out at a temperature between 10° and 70° C.

5. A process according to claim 1 or claim 2, in which the electrodialysis is carried out with an electric field between 0.01 and 0.5 V/cm/g of soluble coffee solids present in the aqueous extract.

6. A process according to claim 1 or claim 2, in which the electrodialysis is carried out with a current density in the range 0.5 to 20 mA/CM$^2$ of membrane.

7. A process according to claim 1 or claim 2, in which the non-cathodic extract is contacted with chitosan at a temperature of 10° to 80° C.

8. A process according to claim 1 or claim 2, in which the non-cathodic extract is contacted with chitosan in a proportion extract/chitosan of 10 to 400 ml/g.

9. A process according to claim 1 or claim 2, in which the non-cathodic extract is contacted with chitosan for 5 to 30 minutes.

10. A coffee extract of reduced acidity obtained by a process according to claim 1.

* * * * *